United States Patent [19]

Dimas et al.

[11] Patent Number: 5,275,628
[45] Date of Patent: Jan. 4, 1994

[54] COMPOSITIONS AND METHOD FOR FOAM CONTROL AND CRYSTAL MODIFICATION IN BAYER PROCESS

[75] Inventors: Peter A. Dimas, Wheaton; Anthony E. Gross, St. Charles, both of Ill.

[73] Assignee: Nalco Chemical Company, Naperville, Ill.

[21] Appl. No.: 31,797

[22] Filed: Mar. 15, 1993

[51] Int. Cl.⁵ .................. C22B 13/00; B01J 13/00; C01F 7/06; C01F 7/14
[52] U.S. Cl. .................. 23/305 A; 423/121; 423/130; 252/308
[58] Field of Search ............... 423/119, 121, 130, 131; 23/305; 252/308

[56] References Cited

U.S. PATENT DOCUMENTS 4,434,142 2/1984 Huckabay .................. 425/111
5,091,160 2/1992 Kondos et al. .................. 423/131

FOREIGN PATENT DOCUMENTS

45528/89 11/1988 Australia .................. 423/130

Primary Examiner—Gary P. Straub
Attorney, Agent, or Firm—Robert A. Miller; Joseph B. Barrett

[57] ABSTRACT

A method for defoaming a Bayer process liquor, the method comprising the steps of adding to the Bayer process liquor an effective amount of an antifoam/-defoamer composition comprising a water-soluble polypropylene glycol having an average molecular weight of from about 200 to about 600 daltons.

6 Claims, 4 Drawing Sheets

COMPOSITIONS AND METHOD FOR FOAM CONTROL AND CRYSTAL MODIFICATION IN BAYER PROCESS

BACKGROUND OF THE INVENTION

1. Field of the Invention

The present invention is directed to improving the Bayer process; and, more particularly, to reducing the foam formed in the liquor of the Bayer process.

2. Description of Prior Art

In the Bayer process for the production of alumina, bauxite ore is pulverized, slurried in water, and then digested with caustic at elevated temperatures and pressures. The caustic solution dissolves oxides of aluminum, forming an aqueous sodium aluminate solution. The caustic-insoluble constituents of bauxite ore (referred to as "red mud") are then separated from the aqueous phase containing the dissolved sodium aluminate. Solid alumina trihydrate is precipitated out of the solution and collected as product.

In more detail, the pulverized bauxite ore is fed to a slurry mixer where a water slurry is prepared. The slurry makeup water is typically spent liquor (described below) and added caustic. This bauxite ore slurry is then diluted and passed through a digester or a series of digesters where, under high pressure and temperature, about 98% of the total available alumina is released from the ore as caustic-soluble sodium aluminate. After digestion, the slurry then passes through several flash tanks wherein the pressure of the digested slurry is reduced from several atmospheres to one atmosphere and the temperature of the slurry is reduced from about 400° F. to about 220° F.

The aluminate liquor leaving the flashing operation contains from about 1 to about 20 weight percent solids, which solids consist of the insoluble residue that remains after, or is precipitated during, digestion. The coarser solid particles may be removed from the aluminate liquor with a "sand trap" cyclone. The finer solid particles are generally separated from the liquor first by settling and then by filtration, if necessary. Any Bayer process slurry taken from the digesters through any subsequent dilution of the slurry, including the flash tanks, but before the primary settler, is referred hereinafter as the primary settler feed. The slurry of aluminate liquor leaving the flash tanks is diluted by a stream of recycled wash overflow liquor.

Normally, the primary settler feed is thereafter fed to the center well of the primary settler, where it is treated with a flocculant. As the mud settles, clarified sodium aluminate solution, referred to as "green" or "pregnant" liquor, overflows a well at the top of the primary settler and is collected. This overflow from the primary settling tank is passed to the subsequent process steps. The treatment of the liquor collected after the primary settlement to remove any residual suspended solids before alumina trihydrate is recovered is referred to as a secondary clarification stage.

The clarified sodium aluminate liquor is seeded with alumina trihydrate crystals to induce precipitation of alumina in the form of alumina trihydrate, $Al(OH)_3$. The alumina trihydrate particles or crystals are then separated from the concentrated caustic liquor, and the remaining liquid phase, the spent liquor, is returned to the initial digestion step and employed as a digestant after reconstitution with caustic.

Because of the organic content of Bayer liquor, it has a natural tendency to foam. The foaming of the liquor is aggravated by mechanical agitation, by airsparging, and by transfer of the liquor from one vessel to the next. Foaming generally occurs after separation of the red mud, and before and during the precipitation of alumina trihydrate. Foam can also develop in transfer points. Foam can occur at any point after the digestion step where the pressure of the digested slurry is reduced to 1 atmosphere. Foaming is especially a problem after separation of the red mud.

The foam poses safety hazards in that the overflow of foam on vessel surfaces is a hazard to process workers since the foam is extremely caustic. The workers would suffer chemical burns upon contact with the foam. It is critical to eliminate or reduce the foam because employee safety is very important to both the employee and the process operator.

The foam also complicates the heat control of the process. Because a vessel surface covered with foam serves as an insulator which retards heat loss, thermal control of the process is difficult. This is especially important because processors strive to reduce liquor temperature during precipitation in order to maximize yield of the product alumina trihydrate.

Vessels filled with large amounts of foam cannot be filled with the maximum quantity of liquor. It is important to fill the vessel completely with liquor in order to maximize product yield and process efficiency. In light of the above safety, engineering and economic problems caused by Bayer process foam many have attempted to ameliorate the problem of foaming.

A variety of treatment types have been employed in the past, including alcohols, glycols, silicon compounds, hydrophobic silica, wax emulsions and fatty acid based treatments. Many of the above chemical treatments do not work in all Bayer process liquors. Of the treatments that do work, many are not persistent antifoam/defoamers, in that the activity diminishes as the treatment chemical moves through consecutive precipitation vessels.

The cost of the above chemical treatments is also high. In a competitive economic climate, a defoamer/antifoam composition having a reduced cost would provide a great economic benefit.

Several of the prior art antifoam/defoamer treatments are malodorous, volatile or hazardous to workers in Bayer process facilities. Operators are actively seeking antifoam/defoaming treatments which are more worker-friendly and environmentally benign.

Several of the antifoam/defoamer compositions listed above, such as the fatty acid based materials, adversely affect crystal size distribution. Also, some antifoam/defoamer compositions such as silica or silicone introduce an undesirable impurity into the Bayer liquor which can reduce the purity, quality and salability of the product alumina trihydrate. This interferes with the control of the process. Accordingly, process operators would like to replace these antifoam/defoaming treatments with a different treatment which does not negatively impact the overall control of the process.

It is well known that polypropylene glycols with molecular weights in excess of about 1,000 daltons are good antifoams because of their limited water-solubility. For example, polypropylene glycol of molecular weight 4,000 is known to have commerical utility as an antifoam in Bayer liquors. One problem with high molecular weight polypropylene glycol preparation currently available is that they are not water-soluble. Water is advantageous as a carrier because it is economical and does not introduce additional organic impurities into the Bayer liquor.

In light of the enormous difficulties posed by the foaming problem in Bayer process liquors and the inadequate antifoam/defoaming tretments currently available, it would be advantageous to provide an antifoam/defoamer composition which prevents or ameliorates Bayer process foam without the problems caused by currently available antifoam/defoamer treatments.

SUMMARY OF THE INVENTION

One aspect of the invention provides a method for defoaming Bayer process liquors. According to the invention, Bayer process liquor is treated with an effective amount of an antifoam/defoamer composition comprising a polypropylene glycol having an average molecular weight of about 200–600 daltons. Preferably, the antifoam/defoamer composition of the invention is added in an effective amount of from about 1 to about 200 parts per million (ppm) or, more preferably, in an effective amount of from about 1 to about 50 ppm. The present invention inhibits the formation of foam a Bayer process liquor. For a variety of reasons, this results in a significant cost savings in the production of alumina trihydrate.

DESCRIPTION OF THE PREFERRED EMBODIMENTS

Figure 1:
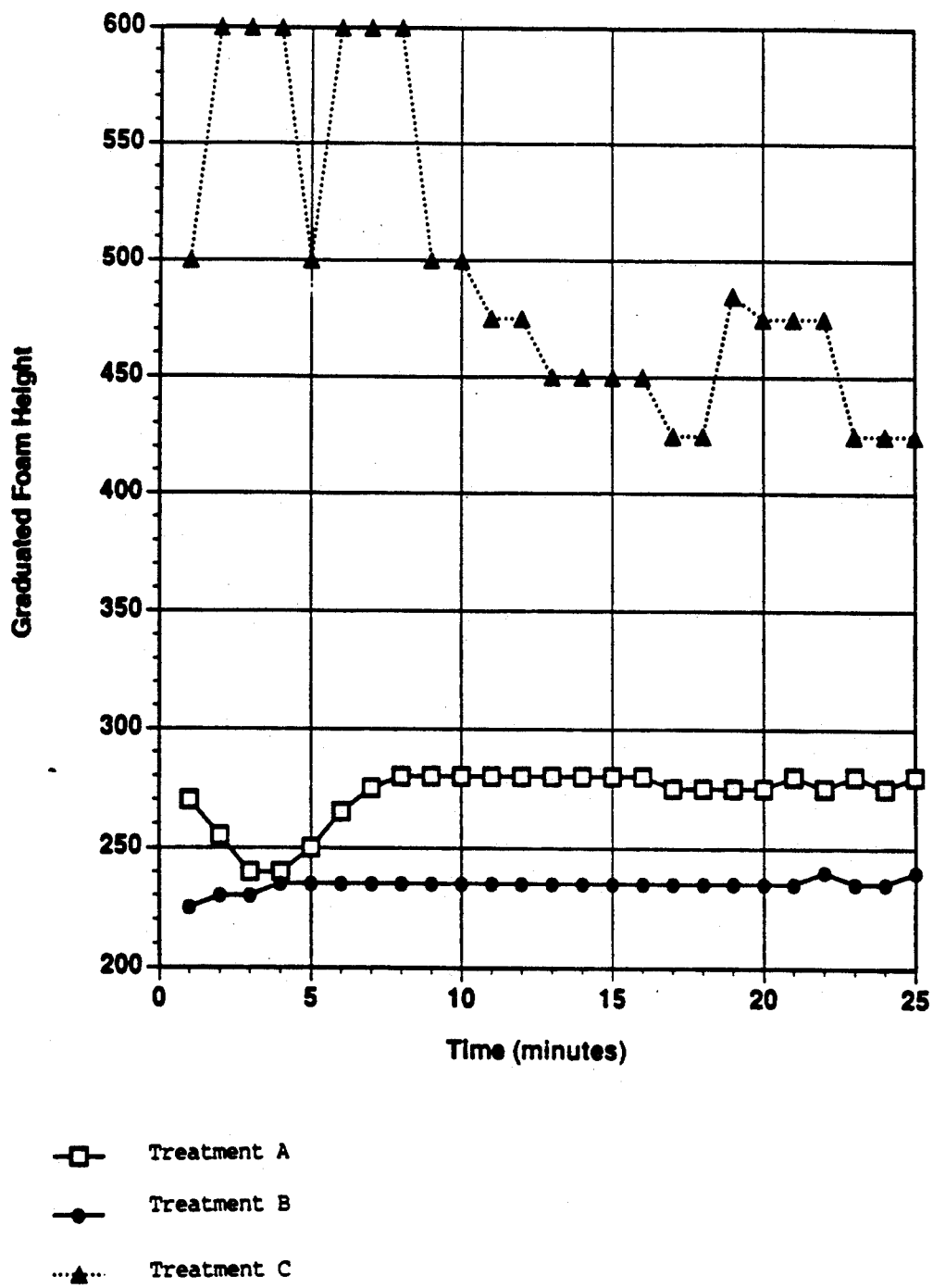
FIG. 1 graphically represents the defoaming activity of the antifoam/defoamer compositions of the present invention compared to a blank control.

The present invention provides a method for defoaming Bayer process liquor which uses an antifoam/defoamer composition comprising a polypropylene glycol having an average molecular weight of from about 200 to about 600 daltons.

It has been surprisingly discovered that low molecular weight, water-soluble polypropylene glycol of the invention are extremely effective antifoams and defoamers. For purposes of this invention, low molecular weight means a molecular weight of less than or equal to about 600 daltons. Although Bayer process liquor is aqueous based, surprisingly, it has been discovered that the polypropylene glycols of the invention have limited solubility in this medium. Generally, it is known in the chemical art that compositions which are soluble in a particular medium will not have antifoam properties in that medium. Without intending to limit the invention, it is believed that the low molecular weight polypropylene glycols of the invention are rendered practically insoluble in Bayer process liquor because of the elevated temperature and exceptionally high caustic and aluminate concentrations. It is believed that this surprising and unexpected phenomenon of insolubility in Bayer process liquors confers upon the polypropylene glycols of the invention exceptional antifoam/defoaming characteristics.

According to the invention, the antifoam/defoamer composition is added to the Bayer liquor immediately after digestion, and immediately prior to, during and after the steps of red mud separation, crystallization, and filtration of the product alumina trihydrate. More preferably, the antifoam/defoamer composition is added to the Bayer liquor after red mud separation and prior to the crystallization of the alumina trihydrate. Preferably, the antifoam/defoamer composition includes an oil carrier, but may be added to the liquor neat or as an aqueous solution. The water-soluble polypropylene glycols of the invention having an average molecular weight of from about 200 to about 600 daltons; and more preferably, of from about 350 to about 500 daltons. Most preferably, the polypropylene glycols of the invention have an average molecular weight of about 400 daltons.

The antifoam/defoamer composition is preferably added to the Bayer liquor in a concentration of from about 1 to about 200 parts per million (ppm), and, more preferably, in a concentration of from about 1 to about 100 ppm. Most preferably, however, the antifoam/defoamer composition is added to the Bayer liquor in a concentration of from about 1 to about 50 ppm.

The following example is presented to describe preferred embodiments and utilities of the invention and are not meant to limit the invention unless otherwise stated in the claims appended hereto.

EXAMPLES 1 AND 2

The following test method was used for Examples 1 and 2.

Bayer liquor was obtained from an operating Bayer circuit and adjusted to the alkalinity encountered in precipitation. 225 grams of the liquor was adjusted to 80° Centigrade. Ten grams of commercial alumina trihydrate was added to the liquor and the suspension was shaken for ten seconds. Chemical defoaming treatment was administered to the suspension. Again, the suspension was shaken for ten seconds and then quickly transferred to a graduated cylinder, and immersed in a water bath which was maintained at 70° Centigrade. A gas dispersion tube was then placed into the bottom of the graduated cylinder, and a regulated infusion of air was introduced through the tube into the liquor. The height of the resulting foam head which was generated by the introduction of the air was measured as a function of time. By this method, the tendency of a chemical treatment to reduce foaming of Bayer liquor was evaluated.

EXAMPLE 1

A laboratory evaluation of the defoamers of the present invention was conducted as described above. Referring to FIG. 1, the defoaming treatments of the invention and a control were evaluated. Treatment A consisted of 13% by weight of a polypropylene glycol having an average molecular weight of about 425 daltons in a oil carrier. Treatment B consisted of 13% by weight of a polypropylene glycol having an average molecular weight of about 425 daltons in distilled water. Treatment C was the blank control. The defoaming treatments of the invention were dosed at 20 parts per million (ppm). As shown in FIG. 1, the polypropylene glycol defoamers of the invention demonstrate significant antifoam/defoamer properties whether the treatment includes either an oil or water carrier.

EXAMPLE 2

Figure 2:
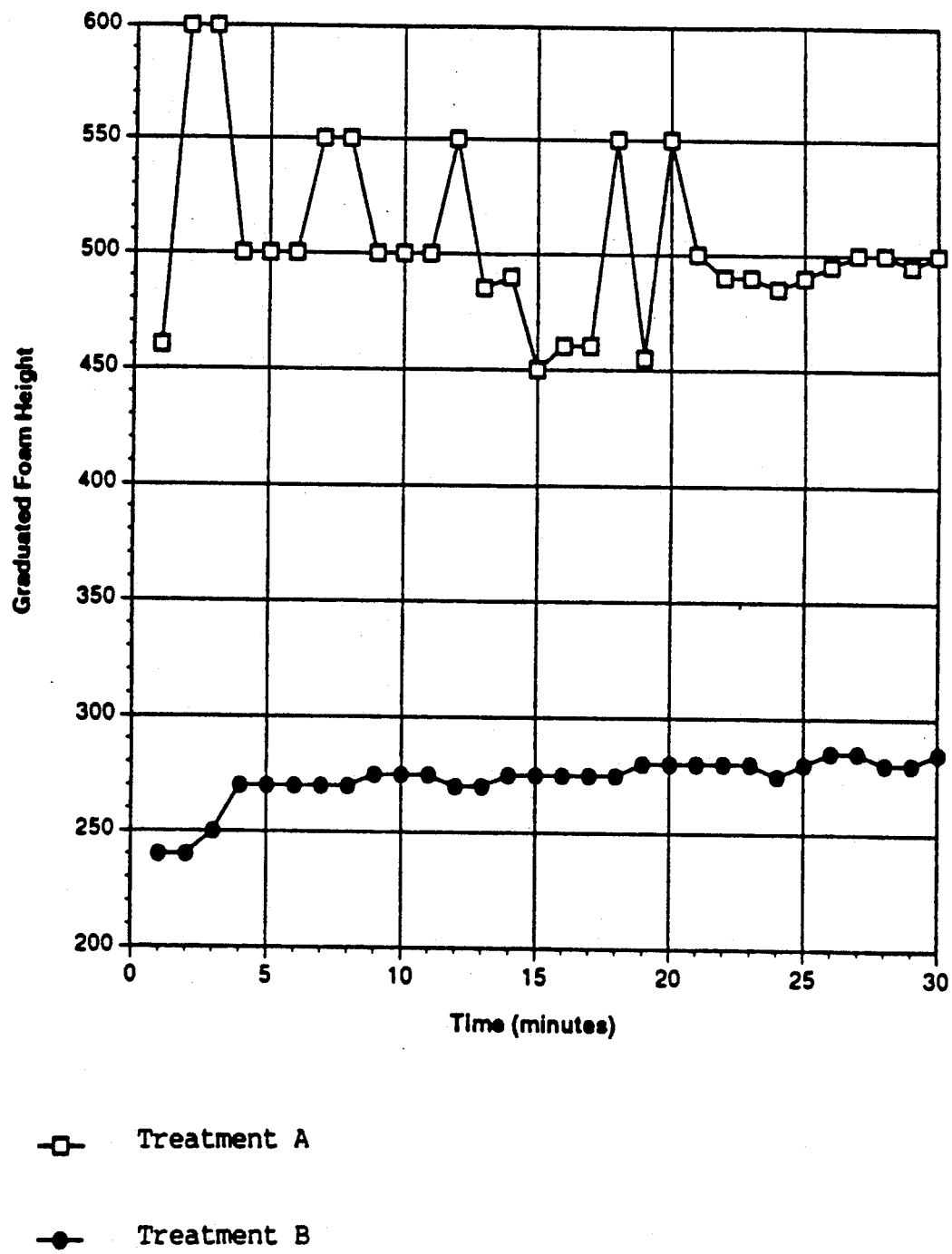
FIG. 2 graphically represents the defoaming activity of the antifoam/defoamer composition of the present invention in the presence of a crystal modifier.

Referring to FIG. 2, a second example of the invention was conducted which evaluated an antifoam/defoamer of the invention. Treatment A consisted of a crystal modifier in mineral seal oil. Treatment B consisted of the same crystal modifier used in Treatment A and 15% by weight of a polypropylene glycol having an average molecular weight of about 400 in mineral seal oil. FIG. 2 shows that, even in the presence of a crystal modifier, the antifoam/defoaming compositions of the invention exhibit strong defoaming characteristics.

EXAMPLE 3

Figure 3:
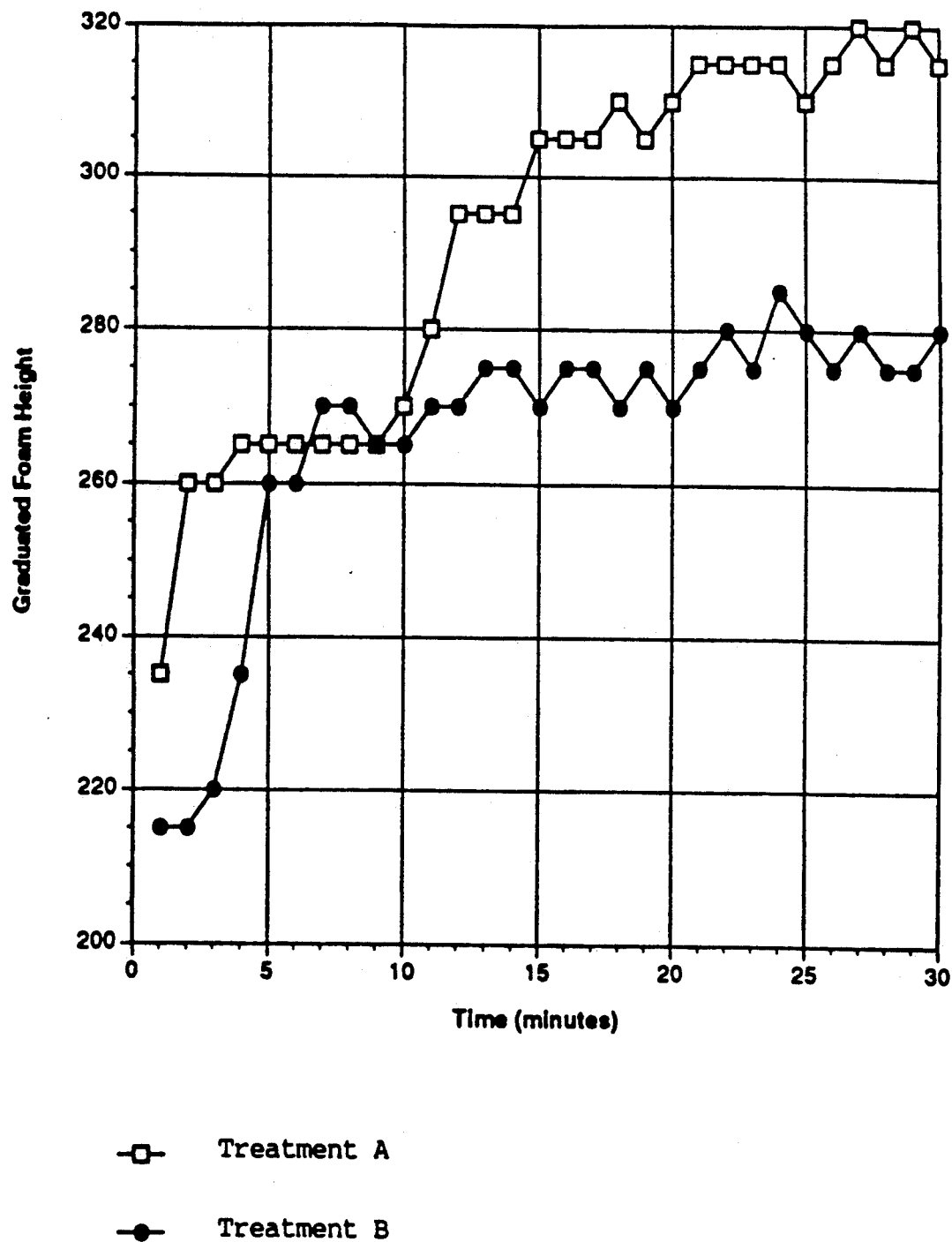
FIG. 3 graphically represents the superior defoaming activity of the antifoam/defoamer composition of the present invention compared to high molecular weight polypropylene glycols which are currently being used in the industry for this application.

A third example was conducted evaluating the defoamers of the present invention compared to high molecular weight polypropylene glycols. Treatment A consisted of 18.8% by weight of a polypropylene glycol having an average molecular weight of about 4,000 daltons and a crystal modifier in an oxo alcohol bottoms carrier. Treatment B consisted of 15% by weight of a polypropylene glycol having an average molecular weight of about 400 and a crystal modifier in an oxo alcohol bottoms carrier. As shown by FIG. 3, the water soluble low molecular weight polypropylene glycol of the invention significantly outperformed the high molecular polypropylene glycol of the prior art.

EXAMPLE 4

The following method was used for Example 4.

Green liquor was obtained from an operating Bayer circuit. 400 mL samples of the liquor were charged with 20 grams of seed. A dose of crystal modifier treatment was administered to each sample and samples were then agitated at 70° Centigrade for 24 hours. At the end of the crystallization, the product alumina trihydrate was recovered from the spent Bayer liquor by vacuum filtration. Filter cakes were thoroughly washed with deionized water. The filter cakes were dried overnight at 110° Centigrade. The particle size distributions of the samples were measured using QUANTACHROME® MICROSCAN® particle analyzers.

Figure 4:
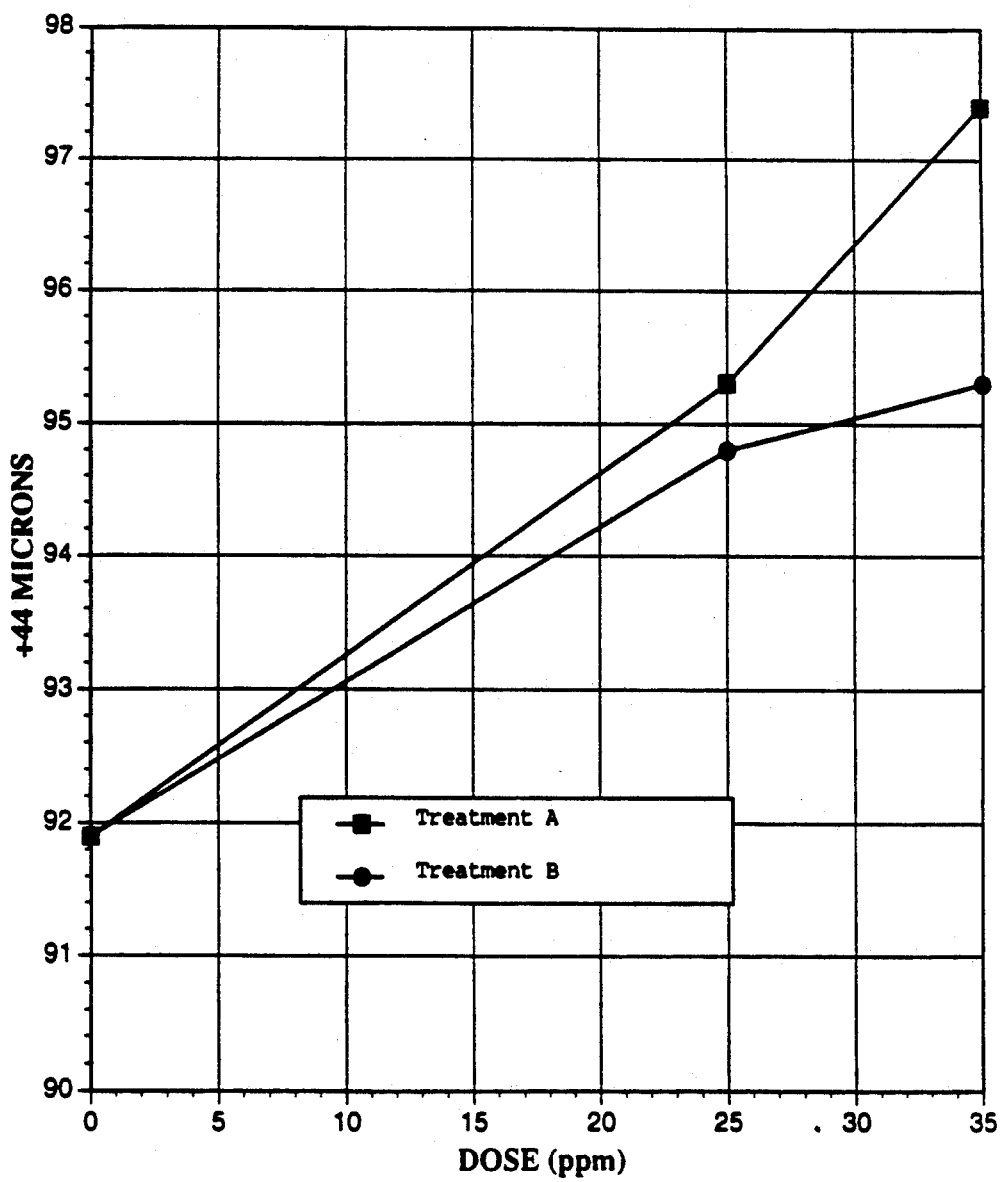
FIG. 4 graphically represents the crystal modifying activity of the antifoam/defoamer compositions of the present invention compared to high molecular weight polypropylene glycols.

Referring to FIG. 4, Treatment A consisted of 10% by weight of a polypropylene glycol having a molecular weight of about 400 daltons in oil. Treatment B consisted of 10% by weight of a polypropylene glycol having an average molecular weight of about 1,000 daltons in oil. As shown in FIG. 4, the antifoam/defoamer composition of the invention significantly increased the coarseness of the precipitated alumina trihydrate crystals when compared to high molecular weight polypropylene glycols.

Changes can be made in the composition, operation and arrangement of the method of the present invention described herein without departing from the concept and scope of the invention as defined in the following claims:

We claim:

1. A method for reducing foam in a Bayer process liquor, the method comprising the steps of adding to the Bayer process liquor an effective amount of an antifoam/defoamer composition comprising a water-soluble polypropylene glycol having an average molecular weight of from about 200 to about 600 daltons, wherein the addition of the effective amount of the antifoam/defoamer composition to the Bayer process liquid reduces foam in the Bayer process liquor.

2. The method of claim 1 wherein the polypropylene glycol has an average molecular weight of from about 300 to about 400 daltons.

3. The method of claim 1 wherein the polypropylene glycol is added to the liquor after red mud separation and prior to crystallization of the alumina trihydrate.

4. The method of claim 1 wherein the antifoam/defoamer composition is added in an effective amount of from about 1 to about 200 ppm.

5. The method of claim 1 wherein the antifoam/defoamer composition is added in an effective amount of from about 1 to about 50 ppm.

6. The method of claim 1 wherein the polyethylene glycol is added during crystallization.

* * * * *